(12) United States Patent
Baumann

(10) Patent No.: US 10,119,618 B1
(45) Date of Patent: Nov. 6, 2018

(54) CONE VALVE

(71) Applicant: Hans D. Baumann, W. Palm Beach, FL (US)

(72) Inventor: Hans D. Baumann, W. Palm Beach, FL (US)

(73) Assignee: H.B. SERVICES PARTNERS L.L.C., W. Palm Beach, FL (US)

( * ) Notice: Subject to any disclaimer, the term of this patent is extended or adjusted under 35 U.S.C. 154(b) by 0 days.

(21) Appl. No.: 15/732,463

(22) Filed: Nov. 16, 2017

(51) Int. Cl.
*F16K 3/22* (2006.01)
*F16K 3/34* (2006.01)

(52) U.S. Cl.
CPC . *F16K 3/22* (2013.01); *F16K 3/34* (2013.01)

(58) Field of Classification Search
CPC .................................. F16K 3/22; F16K 3/34
USPC ...................................... 251/326, 327, 282
See application file for complete search history.

(56) References Cited

U.S. PATENT DOCUMENTS

| | | | | |
|---|---|---|---|---|
| 643,476 A | * | 2/1900 | Crozier | F16K 3/22 251/327 |
| 2,174,861 A | * | 10/1939 | Olson | F16K 5/222 251/326 |
| 2,364,491 A | * | 12/1944 | Triadou | E03D 9/085 251/282 |
| 2,535,953 A | * | 12/1950 | Powers | F16K 3/22 251/327 |
| 2,564,168 A | * | 8/1951 | Meador | F16K 3/22 251/363 |
| 2,668,396 A | * | 2/1954 | Kern, Jr. | G05D 16/0655 251/327 |
| 3,058,718 A | * | 10/1962 | Johnson | F16K 41/12 251/214 |
| 3,648,727 A | * | 3/1972 | Huyck | G05D 16/185 137/505 |
| 3,773,071 A | * | 11/1973 | Stang, Jr. | G05D 16/0655 251/327 |
| 3,877,476 A | * | 4/1975 | Mills | F16K 17/383 251/326 |
| 3,958,592 A | * | 5/1976 | Wells | F16K 3/0254 251/327 |
| 4,320,778 A | * | 3/1982 | Baumann | F16K 47/00 137/454.6 |
| 4,978,062 A | * | 12/1990 | Lange, Sr. | F25B 41/062 236/92 B |

* cited by examiner

Primary Examiner — Eric Keasel

(57) ABSTRACT

A cone type control valve comprising a cone shaped valve plug movably retained in an similarly shaped opening of a valve housing having horizontal inlet and outlet ports and wherein any reciprocal movements of the conical plug can control fluid flow from the inlet to the outlet port. The cone shaped opening furthermore has cavities located perpendicular to the ports, capable to accelerate and de-celerate fluid passing between the two ports.

5 Claims, 3 Drawing Sheets

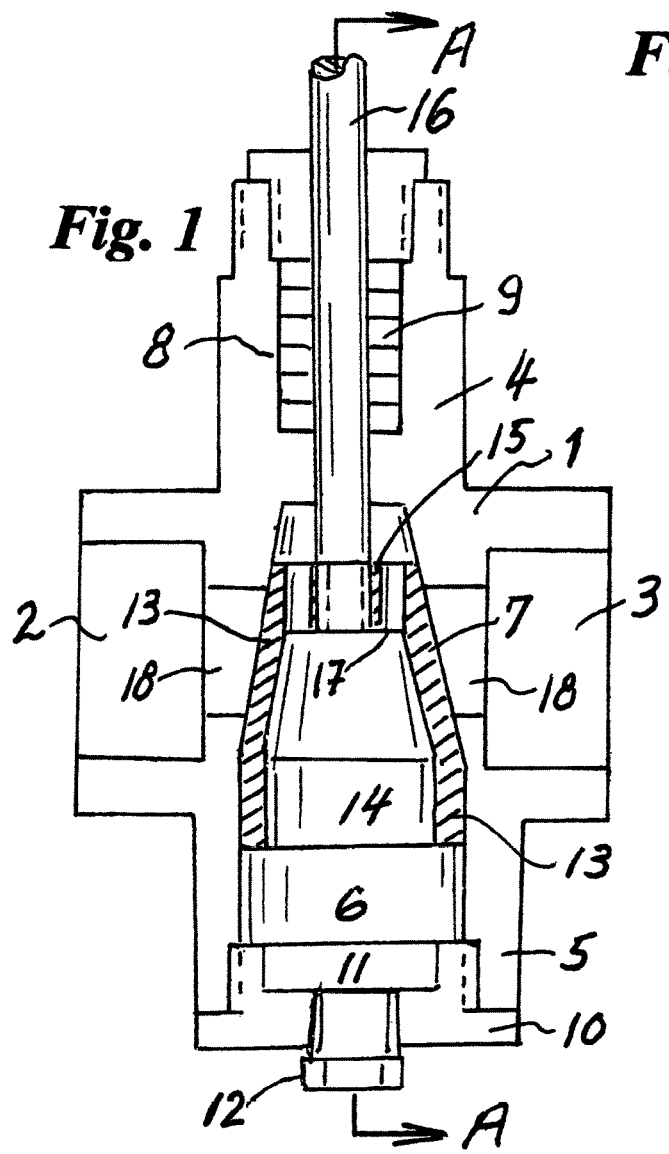
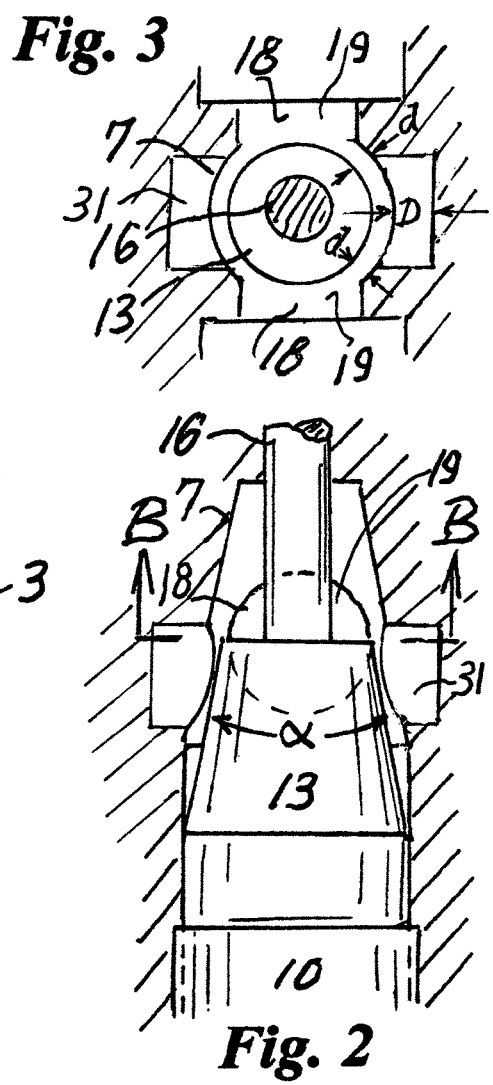

CONE VALVE

BACKGROUND OF THE INVENTION

The invention describes a cone-style globe valve used for throttling of fluid or gases in applications typically found in the chemical, food or climate control applications using modulation valves to finely adjust the flow of fluid following signals from computerized control systems.
State of the art globe style control valves have been in use for centuries and comprise mainly a housing having an inlet and an outlet port, a central orifice connecting the ports and a vertically movable plug capable of selectively restricting the flow of fluid through the orifice. Such globe style control valves have to meet basic requirements besides reasonable cost such as meeting shut-off, an acceptable flow characteristic, low actuating forces and dynamic stability.

This invention constitutes an improvement over the current state of the art in that the design offers fewer parts, resulting in lower manufacturing cost, and greatly reducing force requirements enabling the use of smaller actuating devices for a given valve size, thereby again reducing cost and overall dimensions. In addition, the invention offers increased flow capacity per given orifice size. In contrast to conventional globe valves having single orifices, the invention offers two orifices in succession which can be closed simultaneously thereby substantially reducing the chances of fluid leaking across the valve. In contrast to typically solid valve plugs, the invention features a hollowed plug allowing fluid to pass fault the bottom of the plug to the top thereby greatly reducing forces required to move the plug against high fluid pressures.

Finally, the invention has greatly reduced seating surfaces areas. This enables better shut-off against high fluid pressures.

The purpose of an automatic process control valve is to vary the rate of flow in order to meet the demands of a process control system, such as controlling temperature. Such control can be done two ways:
 1. By the variation of the flow area in a valve, and
 2. By a variation of the hydraulic resistance in a valve passage.

One can define a flow coefficient FC of a valve as:

$$FC = A \times Cc \times Hy / K^{0.5} \text{ at a give valve travel.}$$

Here, A=the flow area, Cc is a contraction coefficient, Hy=a hydraulic coefficient, and K is the velocity head loss coefficient.

Good control valves demand that FC should increase exponentially with travel and that the ratio between FC at maximum travel to minimum travel should at least be thirty to one.

The current invention can accomplish such demands in contrast to prior art devices such as TRIADOU (U.S. Pat. No. 2,364,491). The device by Triadou has only a limited flow capacity since the flow area is defined only by the cone travel multiplied by the tangents of halfe of the cone angle. Furthermore, since the fluid resistance of his circular flow path (see FIG. 6) is constant, FC can only vary with travel; hence there is a linear characteristic (see FIG. 6-a). It offers only two identical and smooth flow paths encouraging cavitation and other un-desirable fluidic phenomenon.

There are so-called plug valves consisting of a housing having two opposed ports where the housing is centrally intersected by a horizontal opening having a conical shape and holding therein a rotatable cone having a horizontal opening aligning after every ninety degree rotation with the opposed ports in order to pass fluid. Such valves are almost exclusively used for the closure of pipes. The rotable cone exhibit a high degree of rotary friction requiring powerful rotary actuators for opening or closing such valves. This type of valve is un-suitable for modulating control since the high friction creates a hysteresis effect, which is very detrimental for stable control. Furthermore, the circular flow paths create very little hydraulic friction and therefore are not suited for pressure reduction.

The fact that the invented cone separates immediately from a similarly shaped conical opening in a housing upon lift-off, eliminates the undesirable friction exhibited by the aforementioned plug valves. Furthermore, a drain opening is provided connecting the housing interior between two ports to the outside, the valve thus being able to evacuate any fluid leakage from the upstream orifice before fluid is able to affect the downstream orifice when the valve is in the closed position. Thus, the invention could serve as a "block and bleed" device. These and other novel features may be gleaned from the following description.

BRIEF DESCRIPTION OF THE DRAWINGS

FIG. 1 is a central, cross-sectional view of a preferred embodiment of the invention in a closed valve position.

FIG. 2 is a cross-sectional view of the central portion of the cone valve along the line A-A in FIG. 1, showing the conical plug in the open position and indicating two opposed concave recesses.

FIG. 3 showing a horizontal, cross-sectional view of the top of the conical plug along the lines B-B in FIG. 2.

DETAILED DESCRIPTION

Figure 4:
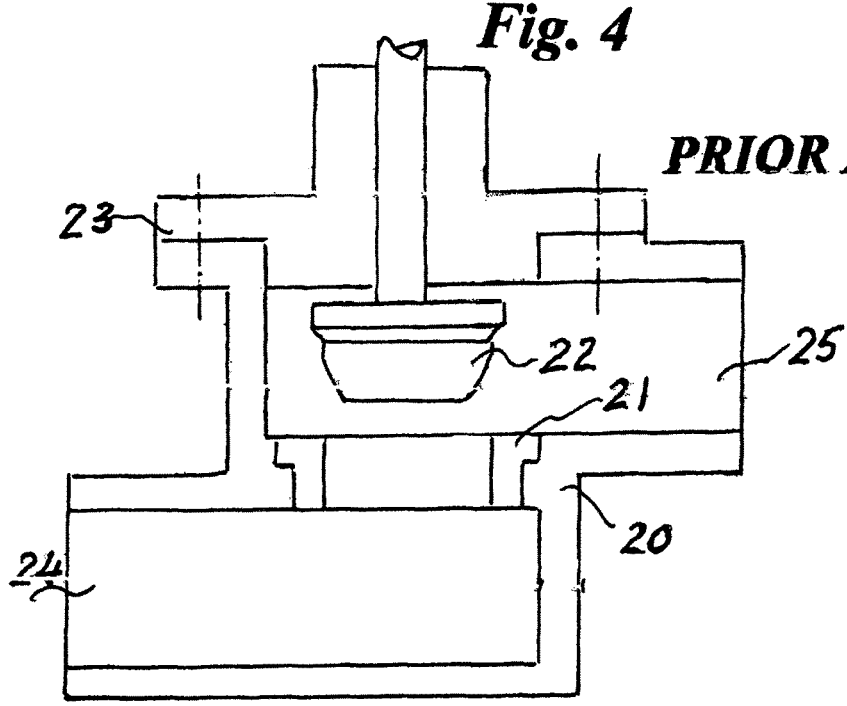
FIG. 4 shows a schematic view of a state of the art globe style control valve.

Referring to FIG. 1, showing the cross-sectional view of the invention which is comprised of a housing (1) having an inlet port (2) and an outlet port (3) on a common horizontal axis. The housing having an upper extension (4) and a lower extension (5).

Housing (1) having central vertical openings commencing with a larger circular bore (6), followed by a conical opening (7) extending through the horizontal axis having inlet and outlet ports.

The conical opening (7) terminates into a reduced bore (8) containing therein a valve packing (9). A threaded closure cap (10) seals the large circular bore (6) to prevent escape of fluid. A drain hole (11) being part of the closure cap and sealed by a plug (12) allows fluid evacuation from the housing if need should arise.

A conical plug (13), slidingly engaging the circular bore (6), has a conical extension fitting tightly into the conical opening (7) of the housing when in the upper position. The plug (13) has a hollow recess (14) terminating in a flattened closure (15) suitably fastened to a valve stem (16) which extends through the upper extension (4) and which is furthermore sealed by valve packing (9). The flattened closure has a number of small ports (17) allowing for communication of fluid between the top and bottom of the conical plug (13). Two opposed orifices (18) extending the inlet and outlet port opening to the conical housing bore (7).

The functions of the invention can be described as follows: In the closed valve position as shown in FIG. 1, the outer surface of the conical plug (13) is in close contact with the conical opening (7) and thereby blocks both orifices (18) to prevent escape of fluid from one of the ports (2) or (3). This is an important feature, since even if there is leakage from the orifice close to one of the ports, this leakage is still prevented from reaching the orifice located near the other port. Such leakage furthermore can be drained from the circular bore (6) through opening (11). The invention thus could serve as a shut-off valve for hazardous fluids.

Following a downward motion, stem (16) is pushing the conical plug (13) down and starts opening the valve to admit fluid from one of the ports (18) to the other. At the beginning of travel, the flow area is defined as the travel distance times 0.5 times the tangent of cone angle α, times the circumference of orifice (18). In an example, given a travel of 1 mm, a cone angle α of 25 degrees and an orifice diameter of 18 mm, here the flow area would be 12.5 mm², thus allowing for very small quantities of fluid. In addition to the described flow areas between the distance between the conical surfaces of both plug (13) conical opening (7), at increased valve travel, an additional flow path (19) is provided between the two orifices (18) as shown in FIGS. 2 and 3. Assuming a travel of 10 mm here the flow area is the sum of (10×0.5×tan α×18×3.14)+0.5×18²×3.14×0.25=250 mm². These examples prove that the invention can achieve a control range of between 12.5 and 250 mm2 or, a range of 20:1. Such control range typically is in-sufficient and additional improvements, as described below, are necessary in order to improve this range.

An important consideration in the design of a control valve is to reduce the amount of force required to open or close the valve plug under fluid pressure. In order to reduce the force requirement, the plug (13) in the invention is partly balanced thru access holes (17) to allow a pressure balance between the top and the bottom of the conical plug (13). Furthermore, the only area subjected to inlet pressure when the valve is closed, is the difference in cone diameter over the length of the orifice (18) times its diameter. In the above example, with an 18 mm diameter of orifice (18) and a cone angle of 25 degrees and the average diameter of the cone plug of 25 mm, this area calculates to 18×18×tan(25/2)=71 mm². Thus, with an inlet pressure of 10 bar, a force of 7 kg is needed to operate the invention. This compares favorably to a conventional globe plug diameter of 25 mm having an area subject to inlet pressure of 466 mm² needing 47 kg of force for 10 bar inlet pressure. This comparison shows that the invented valve can provide substantial savings in the size of actuating devices.

A typical state of the art globe valve is shown in FIG. 4, comprising a housing (20), an orifice seat ring (21), a valve plug (22) and a cover (23) to close the upper housing opening. Fluid enters an inlet port (24) passes between the plug and seat ring and exits outlet port (25). In the closed valve position, the pressure of the incoming fluid will exert a force on the circular area of the plug diameter as described above. Besides high force requirements, valves of this type are expensive due in part that they require more machined parts in comparison to the invented valve and they require more metal. Furthermore, they have no dual-seating features compared to the invention and therefore are more leak prone. Finally, such globe valves have less flow capacity due to the fact that the fluid has to pass a tortuous path across the valve in comparison to the invention, where, in the open position, fluid can travel nearly unhindered from the inlet side of orifice (18) to the outlet side, thereby increasing flow capacity due to lesser fluid resistance.

Figure 5:
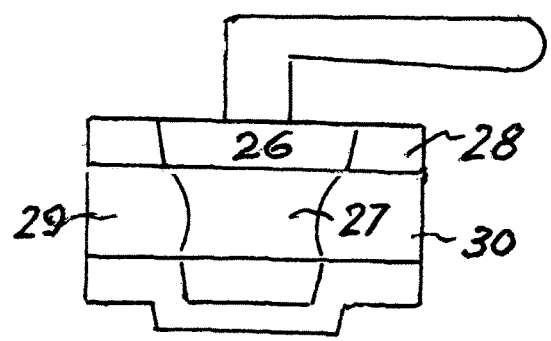
FIG. 5 shows a schematic view of a state of the art rotary plug valve.

A rotary cone type valve commonly called a plug valve, is exhibited in FIG. 5. This is a rotary device consisting of a housing (28) having a vertical conical plug (26) with a central horizontal bore (27) able, in any 90 degrees rotational position, to communicate with inlet port (29) and outlet port (30). Valves such as this have virtually no fluid resistance and therefore are not suitable for control of fluid since any control involves throttling action. Furthermore, these valves have no defined flow characteristic common with state-of-the art globe valves and the current invention. As a result, such plug valves are used almost exclusively for on-off applications.

Figure 6:
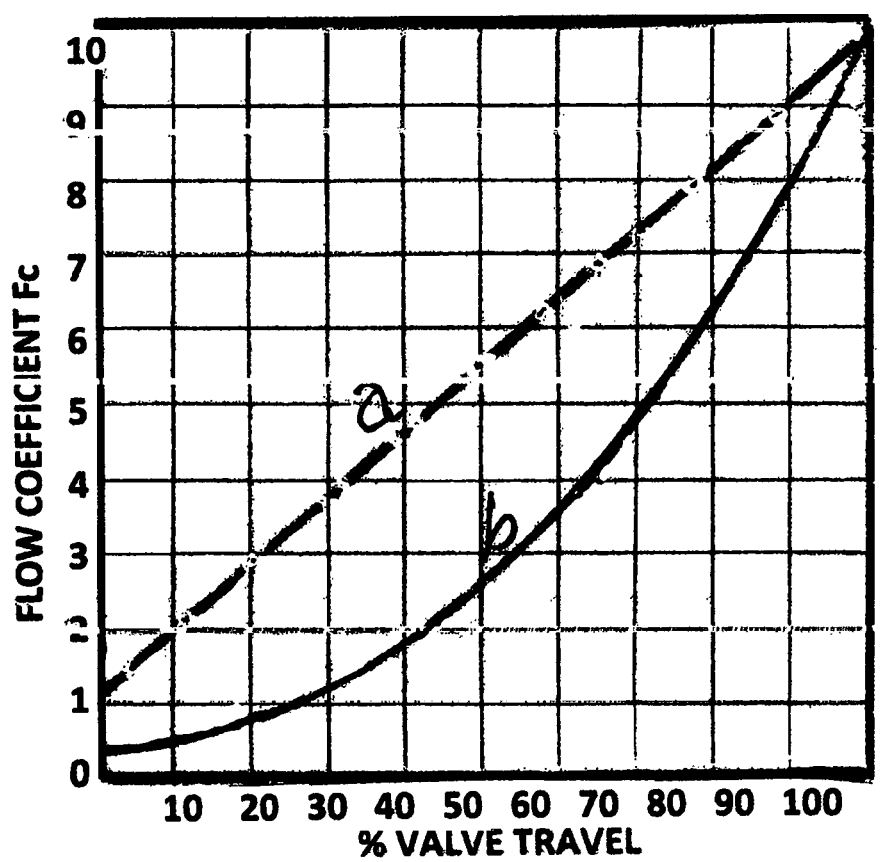
FIG. 6 is a graphical presentation of typical linear (a) and exponential (b) flow characteristics.

Automatic control valves prefer exponential flow characteristics since they offer higher rangeabilty and, in addition, they compensate for pressure losses in adjacent piping. FIG. 6 illustrates such an exponential characteristic (b). Here the flow change at the beginning of the travel is very gradual and commences at a lower value as depicted in curve (a). There are two ways to achieve an exponential characteristic: One is to shape the valve plug to offer progressive flow area increases (see FIG. 4). The second way is to vary the hydraulic resistance inversely proportional with valve travel. The invention exercises the second approach. The hydraulic resistance of a passage can be defined by a hydraulic resistance coefficient K. Here K is defined as:

$$K=1.5[1-(d^2/(d+D)^2)]^2 \text{ combining entry and exit losses.}$$

In an example one can use a d of 0.5 mm and a D of 8 mm. Here $K_{0.5}=1.49$

Assuming further that d=10 while D stays constant at 8, here $K_{10}=0.48$

Dimension d and D are shown in FIGS. 2 and 3.
In terms of flow coefficients FC, here:

$$FC=C\times d/(K)^{0.5}.$$

Thus we have an FC number for 0.5 mm travel of 0.41 C and for 10 mm travel an FC of 14.4 C; a rangeability of 35:1. This range is acceptable.

Referring to FIG. 3, here fluid is entering from one of the orifices (18) and is forced to enter into a narrow circular path (d) located on either side, causing the fluid to accelerate suddenly thus creating hydraulic resistance (K). The next step is to exit (d) and decelerate into an expansion chamber (31) (D) thus encountering a sharp loss of velocity, causing again a much larger head loss (K). Passing chamber (D) at a low velocity, the fluid is again forced to accelerate rapidly while entering the second narrow passage (d) followed again by a sharp exit into the opposite orifice (18). The total head loss (K) as described above is proportional to $d^2/D^2$ and since (d) varies with travel, that makes (K) exponential with travel.

While the invention has been demonstrated in a preferred embodiment, nothing shall preclude from making additional modifications without departing from the scope of the following claims. For example, it is anticipated that the housing can be made in two different sections, that orifices (18) could have a triangular shape instead of being round, or that pipe flanges could be attached to both inlet and outlet ports.

The invention claimed is:
1. A cone control valve comprising a housing having opposed and connected inlet and outlet ports located on a horizontal axis and a vertical axis intersecting the horizontal inlet and outlet ports, said vertical axis has a conical opening, a conical plug having an cylindrical extension and designed to fit into the conical opening of the housing and being capable to block communication between inlet and outlet ports, a stem having one end connected to the conical plug while the opposed end can be motivated to affect vertical movements of the conical plug, allowing selective amounts of fluid to pass from the inlet to the outlet port, said conical opening furthermore has two expansion chambers located perpendicular to the horizontal axis and on opposite sides of the conical plug designed to intercept fluid circulating between inlet and outlet ports and around parts of the circumference of the conical plug in order to add fluid resistance which varies exponentially with the vertical movement of the conical plug, the conical plug has an upper flat terminating portion allowing direct fluid access between inlet and outlet port when at a desired portion of the vertical plug motion, a portion of said stem being enclosed by sealing means being enclosed in said housing to prevent escape of fluid from the housing.

2. A cone control valve as described in claim 1, wherein said conical bore of the housing has a cylindrical extension capable of guiding a similar cylindrical extension of the conical plug.

3. A cone control valve as described in claim 2, wherein a closure cup is connected to the housing to close the cylindrical extension portion of the housing.

4. A cone control valve as described in claim 1, wherein the conical plug has a recessed interior opening of the plug terminating in a flattened closure portion retaining the stem and likewise having one or more bores to allow fluid pressure to equalize between the bottom and the top of the conical plug.

5. A cone control valve as described in claim 3, wherein the closure cup features an opening capable of draining fluid from the interior of the housing.

\* \* \* \* \*